US009893842B2

United States Patent
Eder et al.

(10) Patent No.: US 9,893,842 B2
(45) Date of Patent: Feb. 13, 2018

(54) SYMBOL DETECTION TECHNIQUE

(75) Inventors: Franz Eder, Burgthann (DE); Stefan Mueller-Weinfurtner, Nürnberg (DE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 796 days.

(21) Appl. No.: 14/368,371

(22) PCT Filed: Dec. 28, 2011

(86) PCT No.: PCT/EP2011/006589
§ 371 (c)(1),
(2), (4) Date: Jun. 24, 2014

(87) PCT Pub. No.: WO2013/097875
PCT Pub. Date: Jul. 4, 2013

(65) Prior Publication Data
US 2014/0376358 A1    Dec. 25, 2014

(51) Int. Cl.
*H04L 1/00* (2006.01)
*H04L 1/16* (2006.01)
*H04L 1/18* (2006.01)

(52) U.S. Cl.
CPC .......... *H04L 1/0091* (2013.01); *H04L 1/0054* (2013.01); *H04L 1/0057* (2013.01); *H04L 1/1671* (2013.01); *H04L 1/1812* (2013.01); *H04L 1/1845* (2013.01);
(Continued)

(58) Field of Classification Search
CPC ... H04L 1/0091; H04L 1/1812; H04L 1/0057; H04L 1/1671; H04L 1/0054; H04L 1/1845; H04L 1/0066; H04L 1/0071; H04L 1/1819
See application file for complete search history.

(56) References Cited

U.S. PATENT DOCUMENTS

| 2007/0076805 A1* | 4/2007 | Kalluri ................ H04B 7/0848 375/260 |
| 2009/0135965 A1* | 5/2009 | Shen ................ H03M 13/2957 375/341 |
| 2011/0044409 A1 | 2/2011 | Yoshimoto et al. |

(Continued)

FOREIGN PATENT DOCUMENTS

EP    2 378 696 A1    10/2011

OTHER PUBLICATIONS

International Search Report, PCT Application No. PCT/EP2011/006589, dated Sep. 5, 2012.
International Preliminary Report on Patentability, PCT Application No. PCT/EP2011/006589, dated May 16, 2014.
3GPP, Technical Specification, "3rd Generation Partnership Project; Technical Specification Group Radio Access Network; Evolved Universal Terrestrial Radio Access (E-UTRA); Multiplexing and channel coding (Release 10)", 3GPP TS 36.212 V10.2.0 (Jun. 2011), 78 pp.

(Continued)

*Primary Examiner* — Christopher Grey
(74) *Attorney, Agent, or Firm* — Sage Patent Group (57) ABSTRACT

A technique of processing an Automatic Repeat Request (ARQ) transmission is disclosed. As to a method aspect of the technique, the method comprises the steps of requesting a retransmission of a transport block; receiving the retransmission of the transport block; and detecting modulation symbols. The retransmission is requested in response to an error-detecting code indicating an error in the transport block as received in at least one previous transmission. The modulation symbols are detected based on at least a part of the received retransmission and information from the at least one previous transmission. At least in some embodiments, a detection rate is thus improved.

29 Claims, 6 Drawing Sheets

(52) U.S. Cl.
CPC .......... *H04L 1/0066* (2013.01); *H04L 1/0071* (2013.01); *H04L 1/1819* (2013.01)

(56) References Cited

U.S. PATENT DOCUMENTS

| | | | |
|---|---|---|---|
| 2011/0126072 A1 | 5/2011 | Yoshimoto et al. | |
| 2011/0173508 A1* | 7/2011 | Wehinger .............. | H04L 1/1812 714/748 |
| 2011/0231725 A1* | 9/2011 | Gotman ................ | H04L 1/1845 714/748 |
| 2014/0169797 A1* | 6/2014 | Callard ................ | H04L 1/0054 398/115 |

OTHER PUBLICATIONS

3GPP, Technical Specification, "3rd Generation Partnership Project; Technical Specification Group Radio Access Network; Evolved Universal Terrestrial Radio Access (E-UTRA); Physical layer procedures (Release 10)", 3GPP TS 36.213 V10.2.0 (Jun. 2011), 120 pp.

Miki et al., "Multipath Interference Canceller Using Soft-decision Replica Combined with Hybrid ARQ in W-CDMA Forward Link", *IEEE 54th Vehicular Technology Conference,* vol. 3, Oct. 7-11, 2001, pp. 1922-1926.

* cited by examiner

SYMBOL DETECTION TECHNIQUE

CROSS REFERENCE TO RELATED APPLICATION

This application is a 35 U.S.C. § 371 national stage application of PCT International Application No. PCT/EP2011/006589, filed on 28 Dec. 2011, the disclosure and content of which is incorporated by reference herein in its entirety. The above-referenced PCT International Application was published in the English language as International Publication No. WO 2013/097875 A1 on 4 Jul. 2013.

TECHNICAL FIELD

The present disclosure relates to Automatic Repeat Request (ARQ) transmissions. In particular, and without limitation, the disclosure relates to a technique for processing an ARQ transmission, e.g., a Hybrid ARQ (HARQ) transmission.

BACKGROUND

The advent of information society is closely related to a steady increase in the usage of mobile communication devices. Such mobile communication devices technically evolved from, and still include, mobile telecommunication devices. A typical setup thus includes a telecommunication network comprising a plurality of spatially distributed base stations and a varying number of mobile communication devices connected to one or more of the base stations.

For reliable exchange of data in the telecommunication network, telecommunication standards such as Universal Mobile Telecommunications System (UMTS) or Long Term Evolution (LTE), which are defined by the 3rd Generation Partnership Project (3GPP), use Hybrid Automatic Repeat Request (HARQ) transmissions. HARQ transmissions allow the mobile communication device to selectively request retransmissions of individual information packets based on a timely feedback from the mobile communication device to the base station depending on whether the information packets have been successfully received or not.

In LTE, the information packets are segmented into individually decodable blocks, each of which includes an individual Cyclic Redundancy Check (CRC) value. The mobile communication device feedbacks a Negative Acknowledge (NAK or NACK) signal to the base station in the case of a reception error. The base station has no knowledge of the CRC status of each of the individual blocks as received by the mobile communication device. Thus, the base station transmits all blocks again in response to a HARQ retransmission request. The bandwidth associated with the retransmission of already successfully received blocks is wasted.

In current telecommunication standards, including UMTS and LTE, spatial multiplexing is used to increase spectral efficiency, i.e., to increase the number of transferable bits per time and frequency, by transmitting more than one block at the same time using more than one transmit antenna and more than one receive antenna. Usage of such a Multiple Input Multiple Output (MIMO) channel for the transmission significantly increases a decoding complexity at the receiving side. Limited computational resources of the mobile communication device often only allow approximating an optimal symbol detector by a sub-optimal variant, such as Sphere Decoding.

SUMMARY

There is a need for a technique of processing an Automatic Repeat Request transmission that, at least under certain conditions, achieves a higher detection rate and/or is computationally more efficient.

According to one aspect, this need is satisfied by a method of processing an Automatic Repeat Request, or ARQ, transmission. The method comprises the steps of requesting a retransmission of a transport block in response to an error-detecting code indicating an error in the transport block as received in at least one previous transmission; receiving the retransmission of the transport block; and detecting modulation symbols based on at least a part of the received retransmission and information form the at least one previous transmission.

The information from the previous transmission may relate to any information included in the previous transmission and/or derived using the previous transmission. At least in some embodiments, the information may improve the performance of the symbol detection. The information may represent knowledge that can be used in addition to the retransmitted transport block for the detecting. The information may also be used to improve channel estimation and/or noise estimation. E.g., the information can be used as additional pilots (also referred to as reference symbols). The information may be used as a-priori information for the detecting. The information may be "a-priori" with respect to the retransmission and/or content as received in the retransmission.

The detected modulation symbols may include at least one codeword, e.g. two codewords. Each of the at least one codeword may include one or more code blocks of the transport block. The code block may be smallest independently decodable part of the transport block.

Throughout, the term "transmission" may encompass each of the at least one previous transmission and the retransmission. The transmissions may relate to the same transport block. Alternatively or in addition, the retransmission may differ from one or all of the at least one previous transmission in a redundancy version. The terms "previous" and "previously" can refer to features or steps performed in relation to the at least one previous transmission. The term "soft bit" may encompass a representation of a Log-Likelihood Ratio (LLR).

The method may further comprise one or more of the steps: previously receiving the previous transmission of the transport block; previously detecting previous modulation symbols based on the at least one previous transmission; previously decoding at least one code block included in the transport block based on the at least one previous transmission; and previously detecting the error using the error-detecting code.

The at least one previous transmission may directly precede the retransmission of the transport block. There may be only one previous transmission. In the case of two or more previous transmissions, a directly preceding one of the previous transmissions can be a retransmission relative to its previous transmission. The at least one previous transmission may include up to three previous transmissions.

The information may include at least a part of soft bits or previous modulation symbols previously detected based on the at least one previous transmission of the transport block, soft bits resulting from re-encoding at least some "hard" bits or any other part of the at least one previous transmission of the transport block, or a combination thereof.

The part of the transport block, which is received in the at least one previous transmission and/or used for the information, may relate to the same part of the transport block that is to be detected based on the retransmission and the information. Corresponding parts from the at least one previous transmission and the retransmission may be combined. The combining may, in at least some embodiments, reduce noise in the detecting. Alternatively or in addition, the detecting may be improved, in at least some embodiments, based on cross-correlations between non-corresponding parts. Corresponding parts can include a pair of code blocks that corresponds to each other in the at least one previous transmission and the retransmission. Non-corresponding parts can refer to different code blocks of the transport block.

The detecting may be initialized by the information. Alternatively or in addition, the decoding may use a maximum likelihood detection. The information may be used as a-priori information in the detecting. The information may define an a-priori probability distribution of the modulations symbols to be detected. The a-priori probability distribution defined by the information may deviate from a uniform probability distribution. The detecting may use a Soft-Output Symbol Detector (SOSD) providing the soft bits. Alternatively or in addition, the symbol detector may support the a-priori information. Previously detected modulation symbols based on the at least one previous transmission may also be referred to as previous modulation symbols. A result of the previously detecting may be directly used for generating the information. E.g, soft bits of the previous transmission may be directly used as the information. At least one of the detecting and the decoding may be separately performed for each code block. The detecting of one of the code blocks may take account of the information resulting from another one of the code blocks.

The transport block may include at least one first code block. The at least one first code block may be derived from the detected modulation symbols of the retransmission. The derived at least one first code block may be decoded. Each of the at least one first code block may be separately decoded. The decoding may use a channel decoder or a combination thereof. The channel decoding may exploit redundancy of a Forward Error Correction (FEC). The channel decoder may be a turbo decoder, a Viterbi decoder. The decoding may include soft-combining the modulation symbols from the retransmission and the information from the at least one previous transmission. The information may be stored in and/or retrieved from a HARQ decoder buffer.

The transport block may further include at least one second code block different from the at least one first code block. Each of the at least one first code block may be protected by an error-detecting code. Alternatively or in addition, each of the at least one second code block may be protected by an error-protecting code. The transport block may include an additional error-detecting code protecting the entire transport block. The transport block may include a multiplicity of code blocks. All code blocks of the transport block may be transmitted in each of the transmissions. Each of the code blocks may include an error-detecting code. The at least one first code block and the at least one second code block may be included in the multiplicity of code blocks. Each of the at least one first code block and the at least one second code block may include an error-detecting code. Each of the at least one first code block and the at least one second code block may be independently protected by the error-detecting code.

The error-detecting code may indicate the presence or absence of an error individually for each of the at least one previous transmission and the retransmission (which may collectively be referred to as the transmissions). The method may still further comprise verifying the previously decoded at least one second code block (which may also be referred to as decoded previous second code block) using its error-detecting code. The information may be based on those previous second code blocks which error-detecting code indicates no error. The information may be used in the detection as a-priori information for cancelling the corresponding at least one second code block from the retransmitted received signal. The cancelling may improve the detecting of other code blocks, such as the at least one first code block. In the case of spatial multiplexing, the cancelling may improve detection of another codeword.

The information from the at least one previous transmission may depend on whether the error-detecting code protecting the at least one second code block received in the at least one previous transmission indicates an error or not. If the error-detecting code protecting the at least one second code block, as received in the at least one previous transmission, indicates an error, the information may include previous modulation symbols corresponding to the at least one second code block included in the transport block of the at least one previous transmission.

If the error-detecting code protecting the at least one second code block, as received in the at least one previous transmission, indicates no error, the information may result from re-encoding the at least one second code block previously decoded based on the at least one previous transmission (which is also referred to as the at least one previous second code block). The redundancy of the channel coding may be used to derive soft bits by re-encoding a previously decoded code block. No decoding needs to be performed, based on the retransmission, for the at least one second code block correctly received in the at least one previous transmission. The at least one previously decoded second code block may be selected for the re-encoding based on its error-detecting code indicating no error. Soft bits resulting from re-encoding the at least one previous second code block that indicates no error may be better in assisting the detecting than soft bits from which the at least one previous second block code was decoded. The soft bits derived by re-encoding a previous code block may be "perfect" soft bits in the sense that they correspond to the soft bits used for the transmission (e.g., on a sender side of the transmission). Each of the soft bits representing the re-encoded code block may assume an extreme value. The extreme value may correspond to either certainly zero or certainly one.

At least one of the detecting, the deriving and the decoding may be iterated. The iteration may relate to the transport block as received in the retransmission. The iteration may relate to the processing of the transport block as received in the retransmission. Only the transport block as received in the retransmission may be processed by the iteration. The iteration may differ from a sub-iteration performed as part of the decoding, e.g. within the channel decoder. The iteration may differ from a superordinate iteration performed as part of the transmissions (e.g., an ARQ transmission and ARQ retransmission).

The detecting of the modulation symbols may be repeated, e.g., as part of the iteration. The repeated detecting may be based on at least the part of the retransmission and updated information. Alternatively, the detecting of the modulation symbols may be repeated based on another part of the retransmission (which is different from the part used for the initialization) and updated information.

The updated information may depend on whether the error-detecting code of the at least one second code block, as received in the at least one previous transmission, indicates an error or not. If the at least one error-detecting code protecting the at least one second code block, as received in the at least one previous transmission, indicates no error, the updated information may be based on re-encoding the at least one second code block previously decoded based on the at least one previous transmission.

Alternatively or in addition, the decoding may provide extrinsic information. The updated information may be based on the extrinsic information, if the at least one error-detecting code protecting the at least one second code block, as received in the at least one previous transmission, indicates an error.

The updated information may also depend on whether the error-detecting code of the at least one first code block, as already detected and decoded in the iteration based on the retransmission, indicates an error or not. If the at least one error-detecting code of the at least one first code block, as detected and decoded based on the retransmission, indicates an error, the updated information may further include previous modulation symbols related to the at least one first code block as previously detected based on the previous transmission. The further inclusion may be a combination, e.g. an additive combination.

The detecting may include estimating a channel state of the transmission using the information. The modulation symbols may be detected based on the estimated channel state. The estimating may use the information. The information may be used as a-priori information for the channel estimate. The estimating may use the information as one or more reference signals.

At least one of the information, the updated information, the extrinsic information, the modulation symbols and a result of the re-encoding may include soft bits or may be represented by soft bits.

A result of the decoding may include hard bits or may be represented by hard bits. The re-encoding of code blocks, which error-detecting code indicates no error, may increase the reliability of the information, since redundancy in the decoding may improve the result of both the decoding and the subsequent re-encoding. Furthermore, storing hard bits, e.g. for the re-encoding, requires much less memory as compared to storing the soft bits.

The information may be at least one of stored and updated in a detector buffer. At least one of the detector buffer and a dedicated ARQ buffer stores only those parts of the previously detected modulation symbols, which error-detecting code indicates an error. The parts of the previous modulation symbols may correspond to the one or more code blocks included in the transport block. The error-detecting code, based on which the previous modulation symbols are selectively stored, may be the error-detecting code of the corresponding code blocks. Alternatively or in addition, a code block buffer may store only those previously decoded code blocks, which error-detecting code indicates no error. The modulation symbols and/or the decoded code blocks are stored (at least) until the reception of the retransmission. The modulation symbols may be stored in a decoder buffer, e.g., the HARQ decoder buffer. The modulation symbols in the decoder buffer may change or may be replaced in each transmission and/or each iteration.

Some or all of the buffers may separately store more than one code block, e.g. the at least one first code block and the at least one second code block. At least one of the detector buffer, the decoder buffer, the dedicated ARQ buffer and the code block buffer may be provided for each code block included in the transport block.

The ARQ transmission may be a transmission in a telecommunication network. The ARQ transmission may be a wireless transmission. The ARQ transmission may be an uplink transmission (e.g., from a mobile device to a base station of the telecommunication network) or a downlink transmission (e.g., from the base station to the mobile device). The method may be performed in the telecommunication network by the mobile device, the base station or both in communication.

The error-detecting code may include a Cyclic Redundancy Check (CRC), a parity check or a hash value (e.g., the value of an MD5 algorithm). The CRC indicating the error may relate to at least one of the transport block and a code block included in the transport block.

The ARQ transmission may be a Hybrid ARQ transmission (HARQ transmission). The decoding may use a Forward Error-Correcting (FEC) channel code. The retransmission may include an incremental redundancy. The re-encoding may result in de-noised information that takes account of the FEC redundancy.

The transmission may be over a Multiple Input Multiple Output (MIMO) channel. The detecting may include computing, based on the information, at least one of an estimate of the MIMO channel, a combining weight coefficient of the MIMO channel, and a gain coefficient of the MIMO channel. The at least one first code block and the at least one second code block may be transmitted on different spatial layers of the MIMO channel. In at least some embodiments, the information of the at least one second code block may assist in detecting and/or decoding the at least one first code block due to cross talk or cross correlations between spatial layers of the MIMO channel.

The detecting may include at least one of combining the multiple outputs of the MIMO channel and de-mapping the modulation symbols. The de-mapping may be based on the gain coefficients of the MIMO channel. The modulation of the symbols may include at least one of phase-shift keying and amplitude-shift keying. The amplitude-shift keying may include QAM-16 and/or QAM-64.

According to another aspect, the need is also satisfied by a computer program product. The computer program product comprises program code portions for performing one or more of the steps of any one of the methods described herein, when the computer program product is executed on one or more computing devices. The computer program product may be stored on a computer-readable recording medium, such as a permanent or re-writable memory including flash memory or an optical disc storage. The computer program product may also be provided for download via one or more computer networks such as the Internet, a mobile telecommunication network, or a wireless or wired Local Area Network (LAN).

According to a further aspect, the need is also satisfied by a device for processing an Automatic Repeat Request (ARQ) transmission. The device comprises a sender adapted to request a retransmission of a transport block in response to an error-detecting code indicating an error in the transport block as received in at least one previous transmission; a receiver adapted to receive the retransmission of the transport block; and a symbol detector adapted to detect modulation symbols based on at least a part of the received retransmission and information from the at least one previous transmission.

The transport block may include at least one first code block. The device may further comprise a channel decoder adapted to decode the at least one first code block derived from the detected modulation symbols of the retransmission. The sender and the receiver may be co-located in the device.

The device may further be adapted and/or include further components adapted to perform any one of the steps described in relation to the method aspect.

BRIEF DESCRIPTION OF THE DRAWINGS

In the following, the technique presented herein is described in more detail with reference to exemplary embodiments illustrated in the drawings, wherein.

DETAILED DESCRIPTION

In the following description of preferred embodiments, for purposes of explanation and not limitation, specific details are set forth, such as particular signal processing components and sequences of steps, in order provide a thorough understanding of the present disclosure. It will be apparent to one skilled in the art that the technique described herein may be practiced in other embodiments that depart from these specific details. For example, while the following embodiments will primarily be described in the context of an OFDM-compliant receiver chain, the present invention can also be implemented in other receiver chains processing an ARQ or HARQ transmission. While the embodiments relate to an exemplary LTE implementation, it will be readily apparent that the technique described herein may also be implemented in other mobile or stationary communication networks, such as LTE-Advanced networks.

Moreover, those skilled in the art will appreciate that the components, services, functions and steps explained herein below may be implemented using software functioning in conjunction with a programmed microprocessor, an Application Specific Integrated Circuit (ASIC), a Digital Signal Processor (DSP) or a general purpose computer. It will also be appreciated that while the following embodiments will primarily be described in the context of methods and devices, the technique presented herein may also be embodied in a computer program product as well as a system comprising a computer processor and a memory coupled to the processor, wherein the memory is encoded with one or more programs that may implement the components or may perform the services, functions and steps disclosed herein.

In the following embodiments, an exemplary LTE transmission will be described which multiplexing and channel coding is defined in Technical Specification 3GPP TS 36.212, Version 10.2.0, Release 10, of the $3^{rd}$ Generation Partnership Project, particularly rate matching is described in section 5.1.4. Physical layer procedures are defined in section 7.1 of 3GPP TS 36.213, Version 10.2.0, Release 10.

Figure 1:
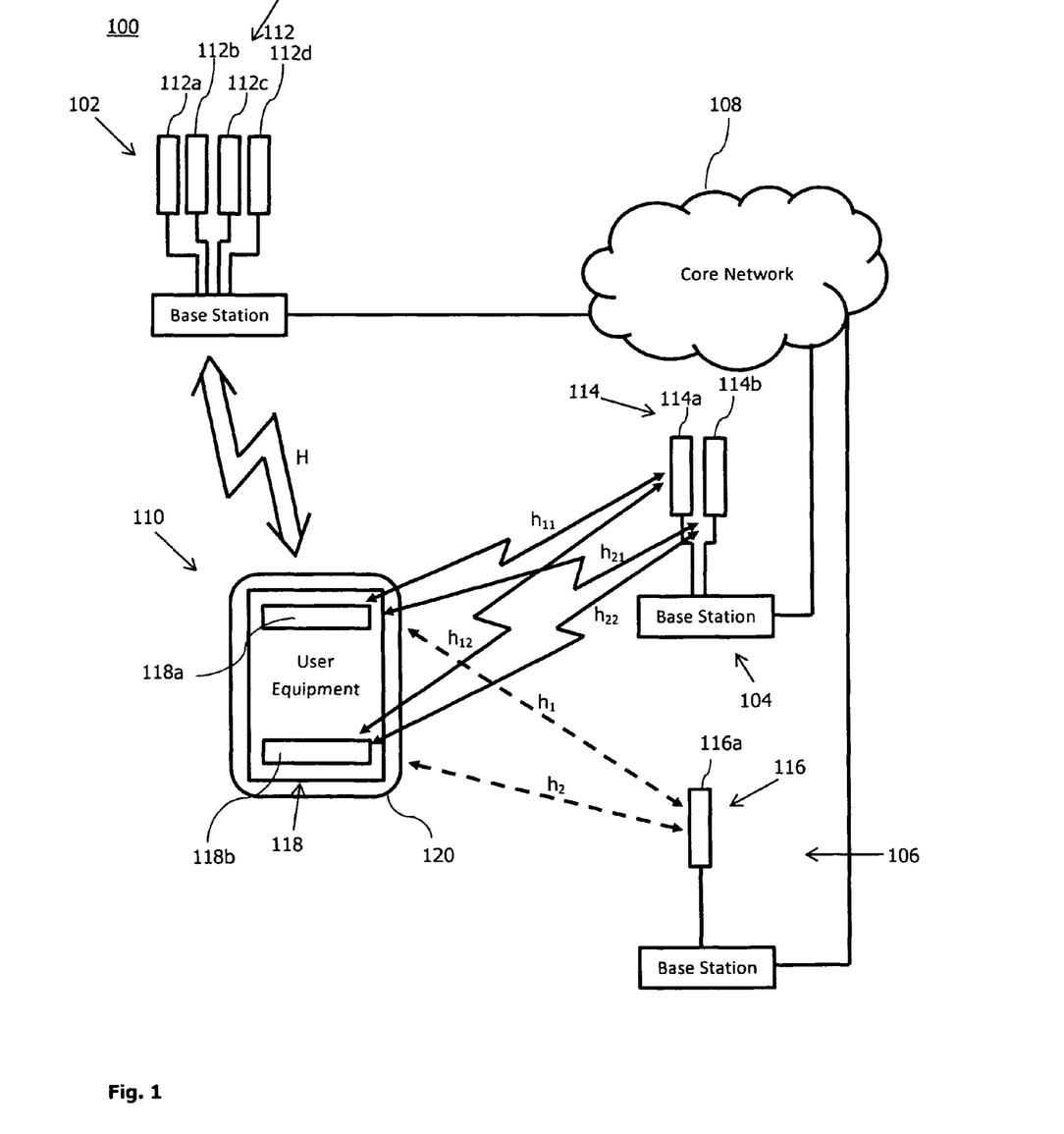
FIG. 1 schematically illustrates an embodiment of a mobile telecommunication network as an exemplary setup for an ARQ transmission.

FIG. 1 schematically illustrates an embodiment of a mobile telecommunication network 100 comprising a plurality of base stations 102, 104 and 106 in mutual communication via a Radio Access Network (RAN) or a Core Network 108. The mobile telecommunication network 100 further comprises a changing number of mobile communication devices, such as a User Equipment 110.

Current standards for wireless data exchange, e.g., 3GPP UMTS or LTE, define spatial multiplexing, i.e., a simultaneous transmission of different signals in more than one spatial layer. To this end, each of the base stations 102, 104, 106 includes an antenna set 112, 114, and 116, respectively. The antenna set can include one antenna 116a, two antennas 114a and 114b, or four antennas 112a, 112b, 112c and 112d. The User Equipment 110 includes an antenna set 118 having a first antenna 118a and a second antenna 118b. The first antenna 118a and the second antenna 118b are spaced apart within a housing 120 of the User Equipment 110.

Figure 2:
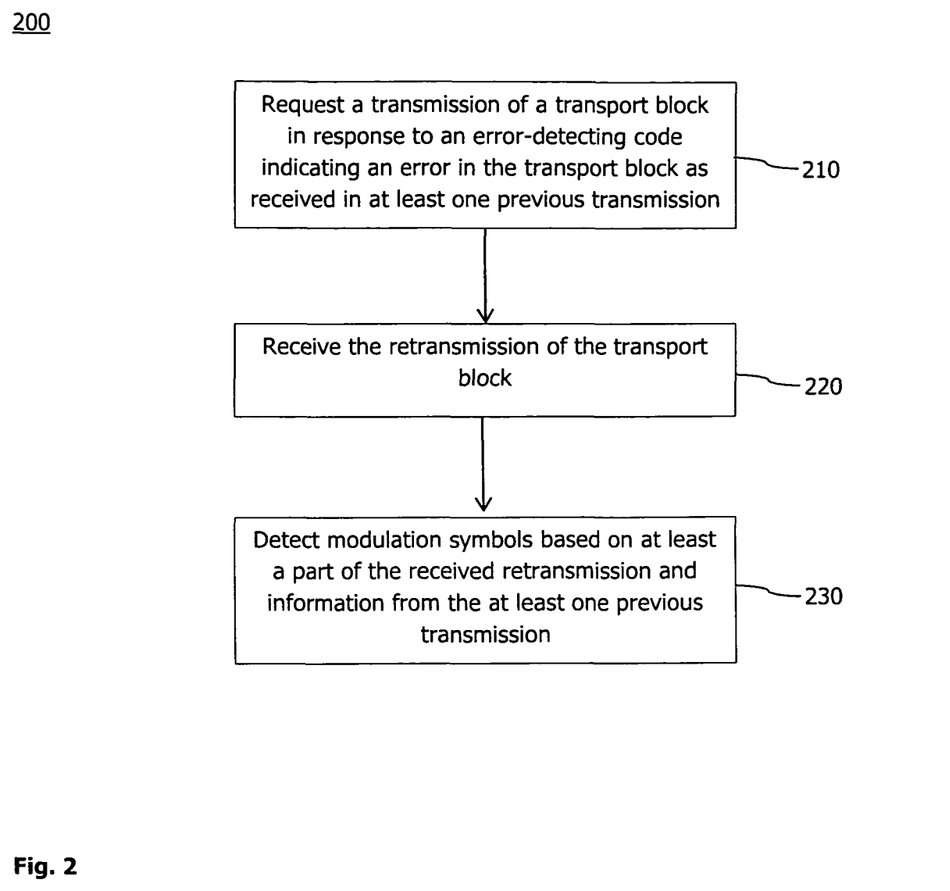
FIG. 2 shows a flowchart of an embodiment of a method of processing an ARQ transmission that can be performed by any network component of the mobile telecommunication network shown in FIG. 1.

FIG. 2 shows an embodiment of a method 200 of processing an Automatic Repeat Request (ARQ) transmission. While in what follows the method 200 and its device implementation will be described from the perspective of the User Equipment 110 in a downlinked transmission, the method 200 and its device implementation can also be applied to any other network component or node in the mobile telecommunication network 100. For example, one or more of the base stations 102, 104, 106 can perform the method 200 in an uplink transmission.

The method 200 comprises a step 210 of requesting a retransmission of a transport block in response to an error-detecting code indicating an error in the transport block as received in at least one previous transmission. In the case of more than one previous transmission, the at least two previous transmissions relate to the same transport block. In a step 220, the retransmission of the transport block is received (which is referred to an ARQ retransmission). Modulation symbols are detected in a step 230 based on at least a part of the received retransmission and information from the at least one previous transmission.

The mobile telecommunication standards 3GPP UMTS or LTE use a Hybrid ARQ (HARQ) transmission. The HARQ transmission combines the selective or adaptative retransmission of an individual Transport Block (TB) based on a corresponding feedback of the receiving entity (e.g., the User Equipment 110) with a Forward Error Correction (FEC) redundancy in the transport block. The FEC redundancy is brought about by a channel code, such as a Viterbi Code or Turbo Code.

Figure 3:
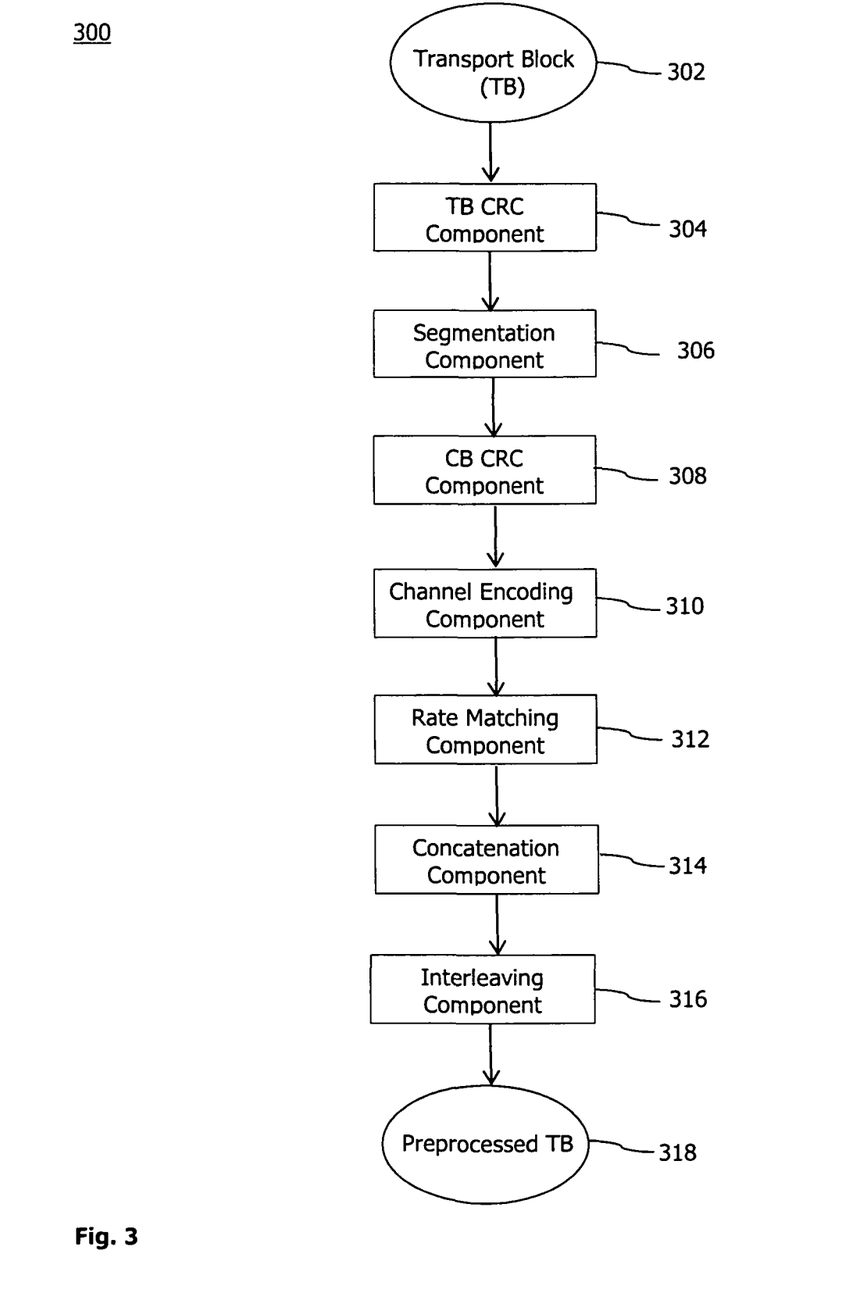
FIG. 3 schematically illustrates an embodiment of a first part of a transmitter chain that can be implemented by any network component of the mobile telecommunication network shown in FIG. 1.

FIG. 3 schematically illustrates processing operations of a first part 300 of a transmitter chain. The first part 300 of the transmitter chain can be used, e.g., on a HARQ transmitting side, for preparing or preprocessing the transport block 302 for the at least one previous transmission and, if requested, for the retransmission of the step 220. In the case of LTE, payload data is received from higher layers (e.g., an application layer) and is delivered to the physical layer in form of the transport block. Each transport block is essentially a bit vector. A Cyclic Redundancy Check (CRC) value of the payload data in the transport block is computed in a step 304 and appended to the transport block. The resulting CRC-protected transport block is segmented into one or several code blocks (CB) in a step 306. In case of more than one code block, a CRC value is computed for each of the code blocks and appended at the end of each code block in a step 308.

Each code block is encoded in a step 310 using a channel encoder. In the case of LTE, the channel encoder is a turbo encoder. The encoded code blocks are rate matched in a step 312 by puncturing or repeating bits. The resulting rate-matched and encoded code blocks corresponding to the same transport channel are concatenated in a step 314 and interleaved in a step 316. Throughout, data related to or including the transport block is referred to as the "transport block", even if the data is represented by a set of code blocks or is in rate-matched or interleaved form, such as a preprocessed transport block 318.

Figure 4:
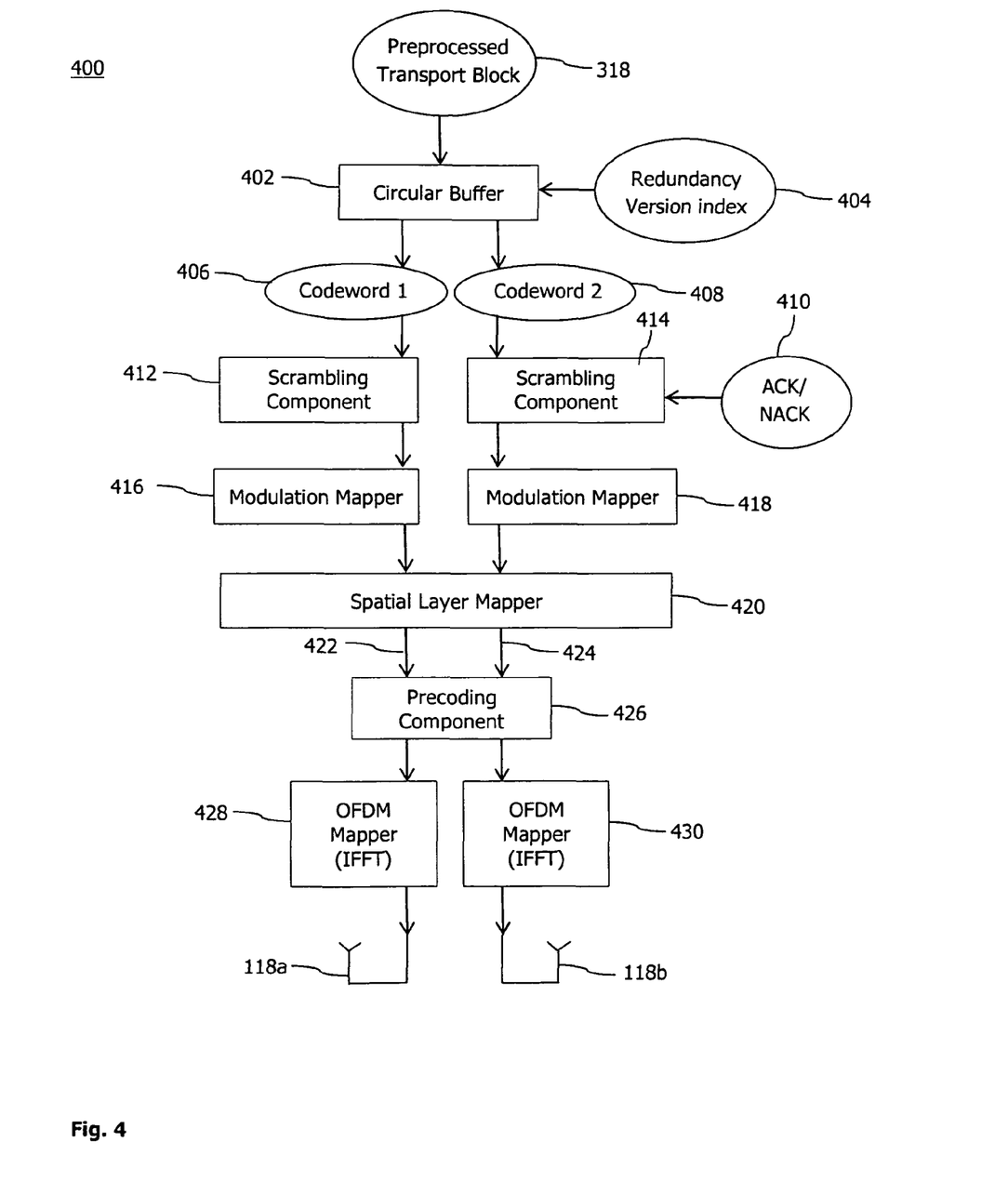
FIG. 4 schematically illustrates an embodiment of a second part of a transmitter chain that can be implemented in any network component of the mobile telecommunication network shown in FIG. 1.

FIG. 4 schematically illustrates a second part 400 of the transmitter chain. The encoded transport block 318 or any other preprocessed transport block is stored in a circular buffer 402. Depending on a Redundancy Version (RV) index 404, different Redundancy Versions of the encoded transport block 318 are extracted from the circular buffer. In the case of LTE, within one millisecond, one or two codewords 406 and 408, each consisting of one or more code blocks, are extracted from the circular buffer 402. In the case of two codewords, the codewords are mapped on different spatial layers for the transmission. The codeword 406 and the codeword 408 are independently scrambled in corresponding components 412 and 414, which allow including further data to be transmitted (e.g., in addition to the payload). If the second part 400 of the transmitter chain is implemented on the HARQ receiving side, e.g., in the user equipment 110, a feedback signal 410 as to a successful reception (signaled by ACK for acknowledged) or an unsuccessful reception (signaled by NACK for negative acknowledged) of the transport block is included in one or both of the scrambling components 412 and 414. The retransmission is requested according to the step 210 by signaling the NACK signal as the feedback signal 410 using the second part 400 of the transmitter chain in the network component performing the method 200.

The one or more codewords 406, 408 are extracted from the circular buffer 402 by means of a sliding window. Different versions of the codewords 406 and 408 are extracted as subsets of the circular buffer 402 depending on the RV index 404. The RV index represents a number of transmissions of the same transport block 302. In other words, the RV index 404 equals one in the first of the at least one previous transmissions and is incremented for each further transmission, including the current retransmission, for an incremental redundancy.

The scrambled codewords are separately modulated in a modulation mapper 416 and 418, respectively. A spatial layer mapper 420 generates the "streams" 422 and 424 (colloquially also referred to as "virtual antennas"). The precoding component 426 linearly (e.g., invertibly) combines the streams 422 and 424 based on knowledge or an estimate of a channel state, as indicated by the matrix H or its components $h_{11}$, $h_{21}$, $h_{12}$, $h_{22}$ or $h_1$, $h_2$ in FIG. 1.

The output of the precoding component 426 is subjected to an Inverse Fast Fourier Transformation (IFFT) in OFDM mappers 428 and 430. The OFDM signals are frequency shifted to the carrier frequency and applied to the antennas 118a and 118b, respectively.

Figure 5:
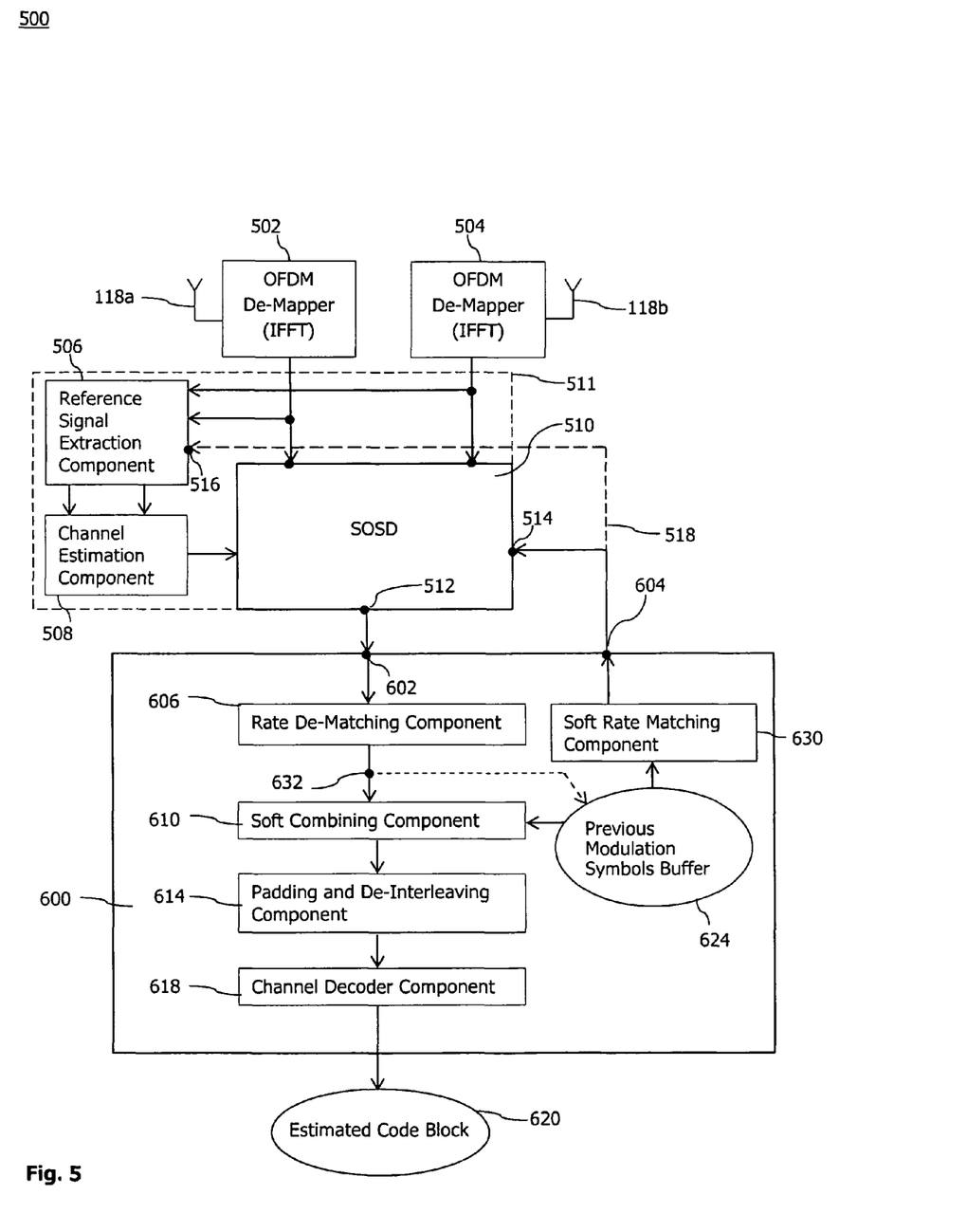
FIG. 5 schematically illustrates an embodiment of a receiver chain that can be implemented in any network component of the mobile telecommunication network shown in FIG. 1.

FIG. 5 schematically illustrates a receiver chain 500 for receiving the HARQ transmission. In one embodiment, the transmitter chain 300, 400 and the receiver chain 500 are collocated in each of the network components 102, 104, 106 or 110 that is adapted to receive the HARQ transmission. For receiving the HARQ transmission, the transmitter chain 300, 400 can be simplified. E.g., it is not necessary that the HARQ receiving network component is capable of transmitting a transport block including a plurality of code blocks. Thus, the first part of the transmitter chain can be omitted in a reduced embodiment of the HARQ receiving network component. Furthermore, the HARQ receiving network component does not need the capability of providing an HARQ retransmission. Thus, the functionality of an incremental redundancy defined by the RV index 404 is not mandatory for the HARQ receiving network component. Regarding the HARQ transmitting network component, the functionality of providing the HARQ feedback signal 410 is not mandatory.

The HARQ receiving network components, e.g., the user equipment 110, does not need a Multiple Input Multiple Output (MIMO) feedback channel for requesting the HARQ retransmission by means of the feedback signal 410. In other words, the transmitter chain 400 of the HARQ receiving network component may include only components for a single spatial layer. For example, a single codeword 408 can be transmitted and the components 412, 416, 420, 426, 428 and 118a can be omitted. In the case LTE prior to the Release 10, the User Equipment 110 includes only a single antenna 118b. A User Equipment 110 complying with LTE according to Release 10 or beyond (e.g., LTE-Advanced) includes the components for two spatial layers in the second part 400 of its transmitter chain.

The receiver chain 500 de-maps the OFDM symbols as received by each of the antennas 118a and 118b by means of a Fast Fourier Transformation in components 502 and 504, respectively. Reference signals (also referred to as pilots) are extracted by a reference signal extraction component 506 from each of the received OFDM symbols. Based on the extracted reference symbols, a channel estimation component 508 estimates the channel state H=($h_{11}$, $h_{12}$, ... ). The channel estimation component 508 further computes weight coefficients and gain coefficients. Based on the weight coefficients, the OFDM symbols from the de-mappers 502 and 504 are combined. The combining of the two different OFDM symbols received from the pair 118 of antennas 118a and 188b can be performed by a soft-output symbol detector (SOSD) 510. The SOSD detects modulation symbols using the gain coefficients. The SOSD 510 generates per spatial layer and per bit of each of the modulation symbols a Log-Likelihood Ratio (LLR). The LLR is also referred to as a soft bit. For example, a soft bit value of −8 may represent a zero bit with certainty. A soft bit value equal to +7 may represent a bit set to 1 with certainty. Intermediate values of the soft bit between −8 and +7 represent a degree of uncertainty in the modulation symbol detection. E.g., a soft bit equal to zero may represent an essentially undetectable soft bit of the modulation symbol. It is to be noted that a code block received with such an undetectable soft bit is not necessarily in error or lost due to the redundancy included in the FEC channel coding.

The optimal SOSD 510 in the case of one spatial layer uses maximum ratio combining or, equivalently Maximum Mean Square Error (MMSE) combining of the OFDM symbols received from the individual receive antennas 118a and 118b via the de-mappers 502 and 504, respectively. In the case of two or more spatial layers, the optimal SOSD 510 is usually approximately by a sub-optimal variant, e.g., using Sphere Decoding.

The LLR underlying the soft bits of the detected modulation symbols are computed based on the complex combined OFDM symbols. The SOSD 510 includes a modulation symbol output 512 providing the detected modulation symbols represented by soft bits to a code block detector 600.

The SOSD 510 may further support an a-priori bias. The a-priori bias is defined as a-priori probability distribution of input soft bits per output soft bits. The a-priori input soft bits are received at an a-priori information interface 514 of the SOSD 510. The SOSD 510 supporting a-priori input soft bit per output soft bits is also preferred to as a-priori SOSD (ASOSD).

In a variant, the detector functionality further includes the reference signal extraction component 506, the channel estimation component 508 and the OFDM symbol combining component. This extended detector functionality is collectively referred to as detector 511. The detector 511 receives the a-priori soft bits at the interface 514. In an advanced variant of the detector 511, the reference signal extraction component 506 receives at an interface 516 the a-priori soft bits via a line 518 (shown as dashed line in FIG. 5). The a-priori soft bits can, e.g., include a pilot signal that can assist in estimating the channel state.

Since in LTE the transport block is organized in one or more code blocks, each of which is individually decodable and protected by a CRC value, the code block decoder 600 receives at a soft input 602 the modulation symbols according to the code block structure. In other words, the code block decoder 600 processes the modulation symbols code block by code block.

The a-priori information is provided by the code block decoder 600 at a soft output 604 in the form of soft bits. The code block decoder 600 comprises a rate de-matching component 606, a soft combining component 610, a padding and de-interleaving component 614, a channel decoder 618, a previous modulation symbols buffer 624 and a soft rate matching component 630. The rate de-matching component 606 performs the segmentation of received soft bits representing the modulation symbols into soft bit segments of the individual code blocks within the transport block. Further, rate de-matching is performed. The resulting soft bits 632 are stored in the previous modulation symbol buffers 624 as the current modulation symbols. The previous modulation symbol buffer 624 comprises memory for separately storing the current modulation symbols and previous modulation symbols for each code block included in the transport block. The current modulation symbols become the previous modulation symbols in the case of a later retransmission. Assuming that the current transmission of the transport block is a retransmission, the previous modulation symbols buffer 624 includes the previous modulation symbols corresponding to the code block to be decoded by the code block decoder 600. The soft combining component 610 combines the soft bits of the previous modulation symbols of the corresponding code block with the current soft bits representing the modulation symbols of the same code block. The combined soft bits are padded (i.e., extended in length by inserting zero value bits) and de-interleaved by the component 614.

The de-interleaved soft bits include, in the case of LTE, three information bit streams, $d_k^{(0)}$, $d_k^{(1)}$ and $d_k^{(2)}$, which are input to the channel decoder 618. In the case of LTE, the channel decoder 618 is a Turbo decoder. In the case of a HARQ retransmission, the knowledge about the encoded information bits stored in the previous modulation symbols buffer 624 from the previous HARQ transmission of the same transport block is thus taken into account by combining the previous modulation symbols with the current soft bits of the HARQ retransmission before feeding the soft bit combination into the channel decoder 618.

The channel decoder 618 outputs an estimated code block 620. The estimated code block is represented by hard bits. The channel decoder 618 performs a polynomial division in order to verify the CRC value of the decoded code block. A result of the CRC verification is output by the code block decoder 600. The additional CRC value for the transport block in its entirety is also verified. If anyone of the code block individual CRC values or the overall transport block CRC value indicates an error, the retransmission of the transport block is requested according the step 210 of the method 200 using the feedback signal NACK 410 inserted into the transmitter chain 400. The base station 102, 104 or 106, with which the User Equipment 110 is currently in wireless connection, has no knowledge about the status of the code block individual CRC results. Consequently, in the retransmission received in the step 220 of the method 200, all code blocks are retransmitted. While existing receiver chains may not use the information related to already successfully received code blocks, i.e., those code blocks of the transport blocks that were in one of the previous transmissions decoded having a good CRC result, or may even not at all use the information relating to the other code blocks, the receiver chain 500 uses the previous modulation symbols available in the previous modulation symbols buffer 624 by soft rate matching the previous modulation symbol in the component 630 and providing the rate-match previous modulation symbol at the soft output 604 to the SOSD 510 or the detector 511. By taking the previous modulation symbol into account, the detection performance can be improved. The advantage of the improved detection does not even require a change at the HARQ transmitting side.

Figure 6:
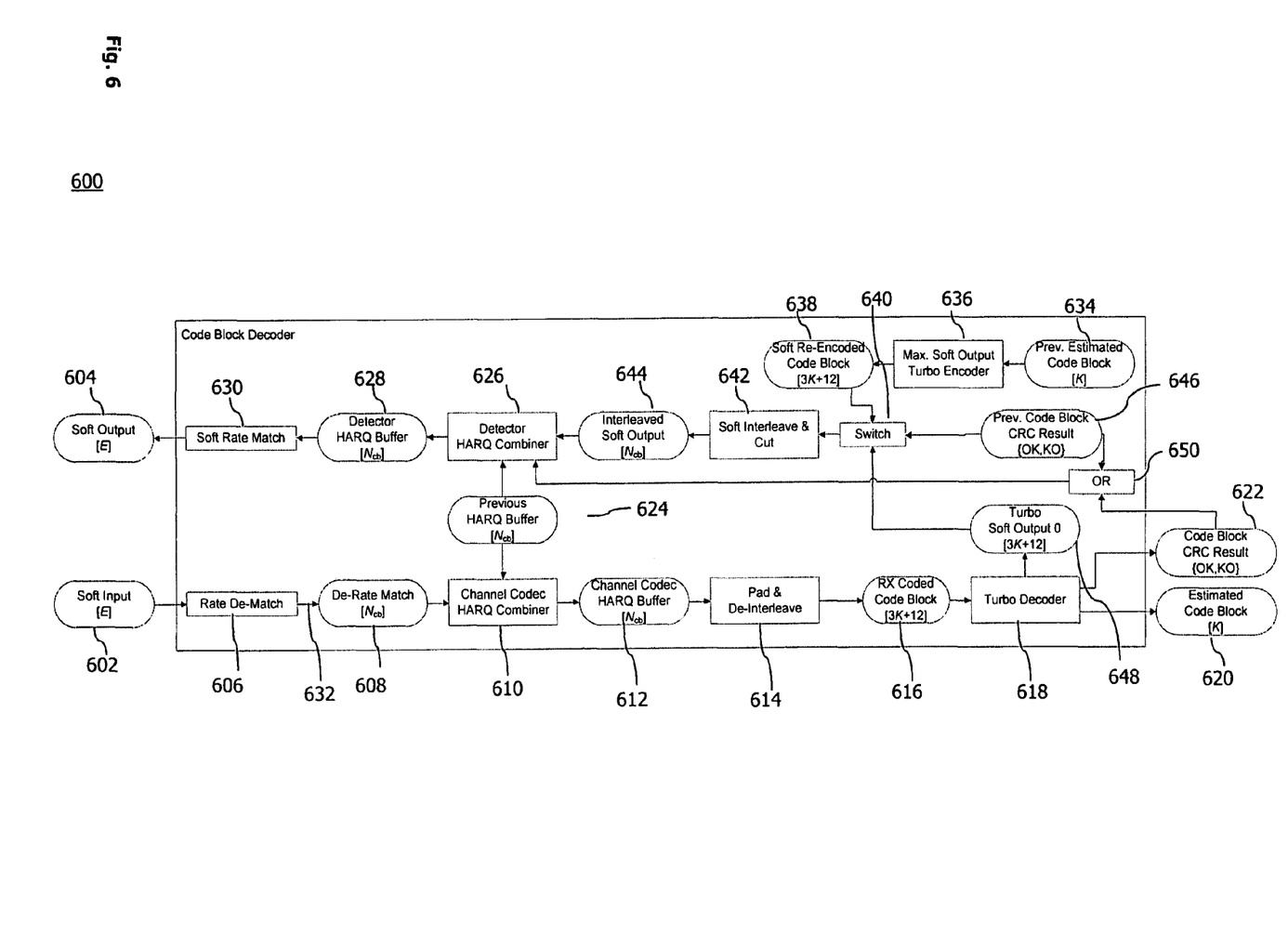
FIG. 6 shows a schematic block diagram of a code block decoder embodiment that can be implemented in the receiver chain shown in FIG. 5.

FIG. 6 shows further details of the code block encoder 600, any one of which details can be in part or completely combined with the code block decoder 600 described above with reference to FIG. 5. The code block decoder 600 shown in FIG. 6 further comprises a previously estimated code block buffer 634. The previously estimated code block buffer 634 stores a number of K hard bits for each previously decoded code block, if its CRC value indicated no error. This is significantly more efficient than storing the underlying previous soft bits (based on which the previously estimated code block was decoded), since a number of the previous soft bits stored in the previous modulation symbols buffer 624 (which is also referred to as the previous HARQ buffer) is $N_{cb}$, wherein each soft bit requires four times more memory than a hard bit according to the $16=2^4$ gradings of the soft bit resolution. Furthermore, the soft bit representation of the previous modulation symbols includes the FEC redundancy by a factor of three according to the three channel code streams. Storing the hard bits of the previously decoded code block in the buffer 634 thus requires approximately 4·3=12 times less memory.

The hard bits are re-encoded to soft bits by the maximum soft output turbo encoder 636. The output of the turbo encoder 636 is represented by maximum soft bits (or soft bits assuming extreme values, e.g., either −8 or +7), since the previously estimated code block is assumed to be correct based on its previous CRC result indicating no error. The soft re-encoded code block is stored in a soft re-encoded code block buffer 638. Depending on the state of a switch 640, the soft re-encoded code block is retrieved from the soft re-encoded code block buffer 638 and soft interleaved and cut by a soft interleaved and cut component 642.

A result 644 of the soft interleave and cut component 642 is output using the soft rate matching component 630 to the soft output 604. The knowledge of decoded code blocks with correct CRC can thus be used as a-priori information for cancelling the corresponding code block from the retransmitted received signal (e.g., the OFDM symbol) for improving the detection. The detection of a first code block or a first codeword (e.g., in case of spatial multiplexing) can be improved based on the knowledge of the previously decoded at least one second code block or an entire second codeword that is different from the first code block or the first codeword, respectively. One potentially underlying reason for the improved detection is a cross-correlation or mutual interference of soft bits in the first code block and soft bits of the second code block, e.g., when transmitted over the MIMO channel. Alternatively or in addition, the knowledge of the previously decoded code blocks with correct CRC can be used to improve channel or noise estimation (e.g., in the channel estimation 508), since the information provided at the soft output 604 can be used as additional pilots (e.g., by the reference signal extraction 506).

The a-priori information provided at the soft output 604 to the SOSD 510 or the detector 511 may dependent in a more advanced variant of the code block decoder 600, as shown in FIG. 6, on at least one of the CRC result 622 of the currently decoded code block provided by the turbo decoder 618 and on the CRC result 646 of the previous code block (i.e., the CRC result 646 of the previously estimated code block, which hard bits are stored in the buffer 634 only in the case of a positive CRC result 646). If the current code block CRC result 622 of the currently estimated code block 620 indicates no error, only the hard bits representing the estimated code block 620 are stored (at the end of the successful decoding of the code block) in the previously estimated code block 634 (for the case of a later retransmission). In this case, no previous HARQ buffer 624 is needed, or is at least not used, for the advantage of the significantly reduced memory requirements mentioned above.

The processing of the retransmission, e.g., by the receiver chain 500, includes an initialization and a subsequent iteration. The code block decoder 600 in the receiver chain 500 is used to decode a single code block. Furthermore, the code block decoder 600 can be used for providing the initial a-priori information at the soft output 604 to the SOSD 510 and, alternatively or in addition, to the detector 511 including the reference signal extraction component 506 and the channel estimation component 508. The information of the at least one previous transmission is stored as soft bits in the previous HARQ buffer 624. The previous HARQ buffer is organized according to the code block structure of the transport block that is retransmitted. In the reduced variant of the code block decoder 600 shown in FIG. 5, all previous modulation symbols of each code block, as received in the at least one previous transmission, are stored in the previous HARQ buffer 624. In the more advanced variant of the code block decoder 600 shown in FIG. 6, the previous HARQ buffer 624 only stores the soft bits corresponding to previous modulation symbols of code blocks that were not successfully detected or not successfully decoded based on the at least one previous transmission. The soft bits corresponding to an individual code block are stored in the previous HARQ buffer 624. The success of the decoding can be indicated by a metric depending on the absolute values of the soft bits of the previous modulation symbols. Alternatively or in addition, the success of the decoding is indicated by the CRC result, which is eventually stored in the previous code block CRC result buffer 646.

It is referred to the one or more code blocks to be detected and/or decoded based on the current retransmission as the at least one first code block. At least one other code block included in the transport block is referred to as an at least one second code block. Since the transport block is transmitted and retransmitted in its entirety, there is the at least one first code block and the at least one second code block included in both the at least one previous transmission and the retransmission. The terms "first code block" and "second code block" thus relate to the code block as such, and do not specify in which transmission or retransmission the code block is received.

In response to the received retransmission in the step 220, a detector HARQ combiner 626 copies the soft bits representing the previous modulation symbols from the previous HARQ buffer 624 into a detector HARQ buffer 628. Here, the copied soft bits can relate to the at least one first code block, the at least one second code block or both. The detector HARQ buffer 628 is input for the soft rate matching component 630, which output in turn provides the soft output 604 for the initialization. In a further variant of the code block decoder 600 shown in FIG. 6, some or all of the soft bits representing the previous modulation symbols corresponding to code blocks successfully detected and/or successfully decoded based on the at least one previous transmission are also stored in the previous HARQ buffer 624. Latter code blocks typically belong to the second code blocks. In the case of such a previously successfully detected and/or previously successfully decoded at least one second code block, the corresponding soft bits copied from the previous HARQ buffer 624 are "perfect" soft bits. The soft bits representing the previous modulation symbols of the at least one second code block are output at the soft output 604 and assist the detection of the other at least one first code block transmitted on the same physical layer or even on a different physical layer. For example, at least one of the at least one first code block can be included in the first code word 406 and one of the at least one second code block can be included in the second code word 408.

The soft rate matching component 630 performs the puncturing and/or repeating of soft bits retrieved from the detected HARQ buffer 628 in accordance with 3GPP LTE standard. The soft rate matching component 630 provides the soft output 604 to the SOSD 510 or, in general, to the detector 511. Thus, in the case of a retransmission, the channel estimation 508 and/or the performance of the SOSD 510 can be improved using the information contained in the soft output 604.

Alternatively or in addition, the channel decoding by the code block decoder 600 providing the soft output 604 contributes to the detecting 230. For example, the iteration of the detecting 230 and the decoding performed by the channel decoder 618 can be implemented by several subsequent calls of the code block decoder 600. The detecting-decoding-iteration (DDI) between the SOSD 510 and the code block decoder 600 is also referred to as a "Turbo loop". The SOSD 510 is used in an iterative fashion together with the channel decoder 618 to take the channel decoding into account. The channel decoder 618 provides a Turbo soft output 648. For example, the Turbo soft output 648 may represent extrinsic information. The extrinsic information is provided in the form of soft bits having the length $3K+12$ compatible with the modulation symbols corresponding to one code block. The Turbo soft output 648 is also referred to as extrinsic soft output. In the iteration, the code block decoder 600 bases the soft output 604 on at least one of the soft re-encoded code block 638, the previous HARQ buffer 624 and the Turbo soft output 648 depending on a combination of the CRC results of the at least one first code block as received in the at least previous transmission and/or the current retransmission and of the at least one second code block as received in the at least one previous transmission.

The channel decoder 618 is not called, or in any other way used, for the initialization in case the CRC result of the at least one first code block was already indicating no error based on the at least one previous transmission. In case the at least one first code block was, based on the retransmission, successfully decoded and/or the modulation symbols detected based on the initialization, as described above, the channel decoder 618 is not called, or used in any other way, for iteratively processing the at least one first code block as received in the retransmission. Otherwise, the soft input 602 is subject to rate de-matching by the components 606. The result 608 is combined by the soft combining component 610 (also referred to as channel codec HARQ combiner) with the soft bits contained in the previous HARQ buffer 624 into a channel codec HARQ buffer 612. The combining is preferably performed by adding the soft bits of the rate-dematching result 608 and the soft bits of the previous HARQ buffer 624. The code block as stored in the channel codec HARQ buffer 612 is de-interleaved by the padding and de-interleaving component 614 and is input into a received coded code block buffer 616. The Turbo decoder 618 retrieves the channel code streams from the received coded code block buffer 616 and provides the estimated code block 620 and the corresponding CRC result 622 of the estimated code block 620. The Turbo decoder 618 further provides the extrinsic soft output 648 in a Turbo soft output buffer.

The switch 640 selectively forwards either the extrinsic information 648 or the soft re-encoded code block 638 to the soft interleaving and cutting component 642 depending on the CRC result 646 of the previously decoded code block as received in the at least one previous transmission. If the previously decoded code block has a CRC result 646 indicating no error, the previously decoded code block has been stored in the previously estimated code block buffer 634 so that the corresponding soft re-encoded code block 638 is retrievable by the switch 640. The switch 640 in conjunction with the previous code block CRC result 646 thus prevents that undefined soft bits from the soft re-encoded code block 638 are retrieved. In other words, whenever the soft re-encoded code block 638 is available, the switch 640 prefers the soft re-encoded code block 638 over the Turbo soft output 648.

The interleaved soft output 644 and the previous modulation symbols stored in the previous HARQ buffer 624 (for the at least one first code block and/or the at least one second code block) is selectively used by the detector HARQ combiner 626 based on the output of the logical disjunction 650. The logical disjunction 650 logically combines the binary CRC result 646 of the previously decoded code block previously estimated based on the at least one previous transmission and the binary CRC result 622 of the at least one first code block 620 currently estimated based on the retransmission. The logical disjunction 650 outputs a positive (good) combined CRC result, if at least one of the CRC results 622 or 646 indicates no error. In the case of a positive combined CRC result, the detector HARQ combiner 626 copies the interleaved soft output 644 into the detector HARQ buffer 628.

In the alternative of a negative combined CRC result, the detector HARQ combiner 626 combines the interleaved soft output 644 and the at least one first code block, as received in the at least one previous transmission, from the previous HARQ buffer 624. The combining can apply the same operation applied for the combining by the channel codec HARQ combiner 610, or any other operation. By way of example, the soft bits of the output 644 and the previous HARQ buffer 624 can be weighted. The interleaved soft output 644 is assigned a higher weight than the previous modulation symbols from the previous HARQ buffer 624.

The detector HARQ combiner 626 outputs the copied or combined result in the detector HARQ buffer 628. Independent of whether a copied or combined result is provided in the detector HARQ buffer 628, the soft rate matching component 630 performs the puncturing and/or repeating of soft bits as described above for the soft output 604.

As has become apparent to the skilled person, at least some of above embodiments receive various advantages. The embodiments use information related to at least one previous transmission to assist at least one of detecting and decoding modulation symbols received in a retransmission. At least some embodiments provide a-priori information from a previous transmission. The same or some other embodiments use a previous HARQ buffer to provide soft bits relating to the previous transmission to at least one of a symbol detector and channel decoder, which improves the performance of the detection or the decoding. At least some embodiments derive the a-priori information by re-encoding a previously successfully decoded portion of a transport block into soft bits. Alternatively, or in addition, the a-priori information is provided to at least one of a channel estimation and a noise-plus-interference estimation, which improves the performance of estimates. Further, same or some other embodiments use at least one of the detector and the decoder in an iterative manner. For example, the a-priori information resulting from the at least one previous transmission can be combined with extrinsic information provided by the decoder in processing the retransmission. A number of needed iterations in the iterative scheme can be reduced, thus reducing implementation complexity. In some embodiments, the previous HARQ buffer can be omitted and at least one of a detector HARQ buffer or a channel codec HARQ buffer can be used for storing the information relating to the at least one previous transmission for use in a later retransmission. Using the detector HARQ buffer may result in a faster convergence of the iteration.

At least some embodiments may thus reduce a detection error rate, improve channel and noise variance estimation performance, yield a faster convergence of the iterative detection schemes, while no or only little additional memory overhead is added in the processing of an ARQ or HARQ transmission.

In the foregoing, principles, embodiments and various modes of implementing the technique disclosed herein have been exemplarily described. However, the present invention should not be construed as being limited to the particular principles, embodiments and modes discussed above. Rather, it will be apparent that variations and modifications may be made by the person skilled in the art without departing from the scope of the present invention as defined in the following claims.

The invention claimed is:

1. A method of processing an Automatic Repeat Request (ARQ) transmission, the method comprising:
    requesting a retransmission of a transport block in response to an error-detecting code indicating an error in the transport block as received in at least one previous transmission, wherein the transport block includes at least one first code block and at least one second code block different from the at least one first code block, each of the at least one first code block and the at least one second code block being independently protected by an error-detecting code;

receiving the retransmission of the transport block, wherein receiving the retransmission of the transport block comprises receiving the retransmission of the transport block including the first and second code blocks;

detecting modulation symbols based on at least a part of the received retransmission and information from the at least one previous transmission;

deriving from the detected modulation symbols of the retransmission the at least one first code block, and decoding the derived at least one first code block.

2. The method of claim 1, wherein the information used by the detecting includes at least a part of soft bits previously detected based on the at least one previous transmission of the transport block, soft bits resulting from re-encoding hard bits previously decoded based on the at least one previous transmission of the transport block, or a combination thereof.

3. The method of claim 1, wherein the detecting is initialized by the information from the at least one previous transmission.

4. A method of processing an Automatic Repeat Request (ARQ) transmission, the method comprising:

requesting a retransmission of a transport block in response to an error-detecting code indicating an error in the transport block as received in at least one previous transmission;

receiving the retransmission of the transport block; and detecting modulation symbols based on at least a part of the received retransmission and information from the at least one previous transmission, wherein the detecting uses a maximum likelihood detection and the information from the at least one previous transmission is used as a-priori information in the maximum likelihood detection for the retransmission.

5. The method of claim 1, wherein the information from the at least one previous retransmission used by the detecting includes previous modulation symbols corresponding to the at least one second code block included in the transport block of the at least one previous transmission, if the error-detecting code protecting the at least one second code block as received in the at least one previous transmission indicates an error.

6. The method of claim 1, wherein the information from the at least one previous retransmission used by the detecting results from re-encoding the at least one second code block previously decoded based on the at least one previous transmission, if the error-detecting code protecting the at least one second code block as received in the at least one previous transmission indicates no error.

7. The method of claim 1, wherein at least one of the detecting, the deriving and the decoding are iterated.

8. The method of claim 1, further comprising:

repeating the detecting of the modulation symbols based on at least the part of the retransmission and updated information, wherein the updated information used by the detecting is based on re-encoding the at least one second code block previously decoded based on the at least one previous transmission, if the at least one error-detecting code protecting the at least one second code block, as received in the at least one previous transmission, indicates no error.

9. The method of claim 8, wherein the decoding provides extrinsic information, and wherein the updated information used by the detecting is based on the extrinsic information, if the at least one error-detecting code protecting the at least one second code block, as received in the at least one previous transmission, indicates an error.

10. The method of claim 9, wherein at least one of the information, the updated information, the extrinsic information, the modulation symbols and a result of the re-encoding includes soft bits or is represented by soft bits.

11. The method of claim 8, wherein the updated information used by the detecting further includes previous modulation symbols of the at least one first code block as previously detected based on the previous transmission, if the at least one error-detecting code of the at least one first code block, as detected and decoded based on the retransmission, indicates an error.

12. The method of claim 1, wherein the ARQ transmission is a Hybrid ARQ transmission, or HARQ transmission, and wherein the decoding uses a Forward Error-Correcting channel code, or FEC channel code.

13. The method of claim 1, wherein the detecting includes estimating a channel state of the retransmission using the information from the at least one previous transmission, and the modulation symbols are detected based on the estimated channel state.

14. The method of claim 1, wherein the retransmission is over a Multiple Input Multiple Output, or MIMO, channel and the detecting includes computing, based on the information from the at least one previous transmission, at least one of an estimate of the MIMO channel, a combining weight coefficient of the MIMO channel, and a gain coefficient of the MIMO channel.

15. The method of claim 14, wherein the detecting includes at least one of combining the multiple outputs of the MIMO channel and de-mapping the modulation symbols.

16. The method of claim 1, wherein at least one of the information, the updated information, the modulation symbols and a result of the re-encoding includes soft bits or is represented by soft bits.

17. The method of claim 1, wherein the information used by the detecting is at least one of stored and updated in a detector buffer.

18. The method of claim 1, wherein at least one of the detector buffer and a dedicated ARQ buffer stores only those parts of the previous modulation symbols, which error-detecting code indicates an error.

19. The method of claim 1, wherein a code block buffer stores only those previously detected code blocks, which error-detecting code indicates no error.

20. The method of claim 1, wherein the modulation symbols are stored in a decoder buffer.

21. The method of claim 16, wherein, for each code block included in the transport block, at least one of the detector buffer, the decoder buffer, the dedicated ARQ buffer and the code block buffer is provided.

22. The method of claim 1, wherein the error-detecting code includes a Cyclic Redundancy Check, or CRC.

23. A device for processing an Automatic Repeat Request, or ARQ, transmission, the device comprising:

a transmitter adapted to request a retransmission of a transport block in response to an error-detecting code indicating an error in the transport block as received in at least one previous transmission, wherein the transport block includes at least one first code block and at least one second code block different from the at least one first code block, each of the at least one first code block and the at least one second code block being independently protected by an error-detecting code;

a receiver adapted to receive the retransmission of the transport block, wherein receiving the retransmission of the transport block comprises receiving the retransmission of the transport block including the first and second code blocks;

a symbol detector adapted to detect modulation symbols based on at least a part of the received retransmission and information from the at least one previous transmission, to derive from the detected modulation symbols of the retransmission the at least one first code block, and to decode the derived at least one first code block.

24. The device of claim 23, wherein the symbol detector uses a maximum likelihood detection and the information from the at least one previous transmission is used as a-priori information in the maximum likelihood detection for the retransmission.

25. The device of claim 23, wherein the symbol detector estimates a channel state of the retransmission using the information from the at least one previous transmission, and the modulation symbols are detected based on the estimated channel state.

26. The device of claim 23, wherein the transport block is protected by an additional error-detecting code protecting an entirety of the transport block including the first and second code blocks.

27. The device of claim 23, wherein the information from the at least one previous retransmission used by the detecting results from re-encoding the at least one second code block previously decoded based on the at least one previous transmission, if the error-detecting code protecting the at least one second code block as received in the at least one previous transmission indicates no error.

28. The device of claim 23, wherein the symbol detector is further adapted to, repeat the detecting of the modulation symbols based on at least the part of the retransmission and updated information, wherein the updated information used by the detecting is based on re-encoding the at least one second code block previously decoded based on the at least one previous transmission, if the at least one error-detecting code protecting the at least one second code block, as received in the at least one previous transmission, indicates no error.

29. The method of claim 1, wherein the transport block is protected by an additional error-detecting code protecting an entirety of the transport block including the first and second code blocks.

* * * * *